(12) United States Patent
Oya et al.

(10) Patent No.: US 11,153,447 B2
(45) Date of Patent: Oct. 19, 2021

(54) IMAGE PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventors: Kazuhiro Oya, Kanagawa (JP); Akane Abe, Kanagawa (JP); Akinobu Yamaguchi, Kanagawa (JP); Kunihiko Kobayashi, Kanagawa (JP); Junichi Shimizu, Kanagawa (JP); Shigeru Okada, Kanagawa (JP); Shintaro Adachi, Kanagawa (JP); Shinya Nakamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 169 days.

(21) Appl. No.: 16/246,555

(22) Filed: Jan. 14, 2019

(65) Prior Publication Data
US 2019/0230233 A1    Jul. 25, 2019

(30) Foreign Application Priority Data

Jan. 25, 2018  (JP) .............................. JP2018-010766

(51) Int. Cl.
*H04N 1/00* (2006.01)
*G06K 9/00* (2006.01)

(52) U.S. Cl.
CPC ..... *H04N 1/00331* (2013.01); *G06K 9/00463* (2013.01); *H04N 1/00336* (2013.01)

(58) Field of Classification Search
CPC ........... H04N 1/00331; H04N 1/00336; H04N 1/00005; H04N 1/00037; H04N 1/00411; H04N 2201/0094; G06K 9/00463; G06K 9/3208; G06K 2209/01; G06K 9/0042; G06K 9/00469; G06K 9/2054; G06K 9/00449; G06K 9/00993; G06K 9/18; G06K 9/344; G06K 9/6215; G06F 40/174; G06F 40/242; G06F 40/279
(Continued)

(56) References Cited

U.S. PATENT DOCUMENTS 5,199,081 A * 3/1993 Saito .................. H04N 1/46
382/116
5,265,171 A * 11/1993 Sangu ................... G06F 40/191
382/177

(Continued)

FOREIGN PATENT DOCUMENTS

| JP | H11213089 | 8/1999 |
| JP | 2006260274 | 9/2006 |
| JP | 2017151493 | 8/2017 |

*Primary Examiner* — Negussie Worku
(74) *Attorney, Agent, or Firm* — JCIPRNET

(57) ABSTRACT

An image processing apparatus includes a layout analyzing part that executes layout analysis for image data, an extraction part that extracts a diagrammatic representation from the image data by using a result of the layout analysis, a character recognizing part that executes character recognition for a partial area having a high probability of presence of a character string in a relationship with the extracted diagrammatic representation, and an erecting direction deciding part that decides an erecting direction of the image data by using a result of the character recognition.

18 Claims, 8 Drawing Sheets

(58) Field of Classification Search
USPC ......................................................... 358/462
See application file for complete search history.

(56) References Cited

U.S. PATENT DOCUMENTS

| | | | | |
|---|---|---|---|---|
| 7,136,526 | B2* | 11/2006 | Hotta | G06K 9/2054 |
| | | | | 382/187 |
| 7,321,688 | B2* | 1/2008 | Fujiwara | G06K 9/38 |
| | | | | 382/176 |
| 7,499,588 | B2* | 3/2009 | Jacobs | G06K 9/00463 |
| | | | | 382/173 |
| 7,567,730 | B2 | 7/2009 | Ohguro | |
| 7,860,266 | B2* | 12/2010 | Sekiguchi | H04N 1/00331 |
| | | | | 382/100 |
| 2005/0238209 | A1* | 10/2005 | Ikeda | G06K 9/00248 |
| | | | | 382/118 |
| 2006/0078200 | A1* | 4/2006 | Koyama | G06K 9/00456 |
| | | | | 382/181 |
| 2009/0110281 | A1* | 4/2009 | Hirabayashi | G06K 9/00993 |
| | | | | 382/180 |
| 2009/0110288 | A1* | 4/2009 | Fujiwara | G06K 9/00463 |
| | | | | 382/190 |
| 2012/0038941 | A1* | 2/2012 | Megawa | G06F 21/608 |
| | | | | 358/1.13 |
| 2017/0244851 | A1 | 8/2017 | Oya et al. | |
| 2018/0101725 | A1* | 4/2018 | Schmidt | G06K 9/00449 |
| 2018/0218232 | A1* | 8/2018 | Tokuda | G06K 9/00442 |
| 2019/0362143 | A1* | 11/2019 | Nakamura | G06K 9/00469 |
| 2020/0005067 | A1* | 1/2020 | Seong | G06K 9/3241 |
| 2021/0019554 | A1* | 1/2021 | Kawara | G06K 9/344 |

* cited by examiner

FIG. 5

| ITEM | QUANTITY | UNIT | UNIT PRICE | AMOUNT |
|---|---|---|---|---|
| MULTI-LOGGER | 1 | SET | 1,980.00 | 1,980.00 |
| BASE SET | 1 | SET | 300.00 | 300.00 |
| EXTENSION TERMINAL | 1 | SET | 600.00 | 600.00 |
| SUBTOTAL | | | | 2,880.00 |

FIG. 6

| ITEM | QUANTITY | UNIT | UNIT PRICE | AMOUNT |
|---|---|---|---|---|
| MULTI-LOGGER | 1 | SET | 1,980.00 | 1,980.00 |
| BASE SET | 1 | SET | 300.00 | 300.00 |
| EXTENSION TERMINAL | 1 | SET | 600.00 | 600.00 |
| SUBTOTAL | | | | 2,880.00 |

FIG. 7

| No. | ITEM | QUANTITY | UNIT | UNIT PRICE | AMOUNT |
|---|---|---|---|---|---|
| 1 | SOFTWARE DEVELOPMENT | 1 | SET | | 1,000.00 |
| | 1-1 DESIGNING | | | 400.00 | |
| | 1-2 IMPLEMENTATION | | | 600.00 | |
| 2 | GENERAL AND ADMINISTRATIVE EXPENSES | 10 | % | 2,840.00 | 2,840.00 |
| | SUBTOTAL | | | | 3,840.00 |

TABLE 1 LIST OF SOFTWARE EXPENSES

| No. | ITEM | QUANTITY | UNIT | UNIT PRICE | AMOUNT |
|---|---|---|---|---|---|
| 1 | SOFTWARE DEVELOPMENT | 1 | SET | | 1,000.00 |
| | 1-1 DESIGNING | | | 400.00 | |
| | 1-2 IMPLEMENTATION | | | 600.00 | |
| 2 | GENERAL AND ADMINISTRATIVE EXPENSES | 10 | % | 2,840.00 | 2,840.00 |
| | SUBTOTAL | | | | 3,840.00 |

FIGURE 1 FREQUENCY DISTRIBUTION

IMAGE PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-010766 filed Jan. 25, 2018.

BACKGROUND

(i) Technical Field

The present disclosure relates to an image processing apparatus and a non-transitory computer readable medium storing a program.

(ii) Related Art

Japanese Unexamined Patent Application Publication No. 2017-151493 describes an image processing apparatus including an acquisition part and an output part for the purpose of outputting character information to be recognized in an erecting direction of a document that is obtained at a higher speed than in a case in which determination is made on the erecting direction by using image information of the entire document. The acquisition part acquires image information in a first area that is provided for detection of an erecting direction of an image formed on the document and is defined in advance based on a reference different from that of a second area where character recognition is executed in the image. The output part outputs character information in the second area that is recognized in the erecting direction of the image that is obtained based on the image information. Each character included in the predetermined area is read in four directions of 0°, 90°, 180°, and 270° and is compared with character patterns in a predetermined dictionary. In each of the four directions, a character pattern in the dictionary that has a closest feature is identified. At this time, a certainty factor indicating the degree of closeness of the feature is calculated as well. A character pattern having a highest certainty factor among the calculated certainty factors of the four directions is obtained as a result of the character recognition and a direction in this case is determined as the erecting direction.

SUMMARY

Aspects of non-limiting embodiments of the present disclosure relate to a decrease in the accuracy of the erection determination that may be caused when determination is made on the erecting direction by executing character recognition for only a predetermined fixed area irrespective of a result of layout analysis for a diagrammatic representation and when characters appropriate for the erection determination are not included in the predetermined fixed area.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus comprising a layout analyzing part that executes layout analysis for image data, an extraction part that extracts a diagrammatic representation from the image data by using a result of the layout analysis, a character recognizing part that executes character recognition for a partial area having a high probability of presence of a character string in a relationship with the extracted diagrammatic representation, and an erecting direction deciding part that decides an erecting direction of the image data by using a result of the character recognition.

BRIEF DESCRIPTION OF THE DRAWINGS

Exemplary embodiments of the present disclosure will be described in detail based on the following figures, wherein:

FIG. 5 illustrates an example of an erection determination area of the exemplary embodiment;

FIG. 6 illustrates another example of the erection determination area of the exemplary embodiment;

FIG. 7 illustrates still another example of the erection determination area of the exemplary embodiment;

DETAILED DESCRIPTION

Exemplary embodiments of the present disclosure are described below with reference to the drawings.

FIRST EXEMPLARY EMBODIMENT

First, the hardware configuration of an image processing apparatus 10 of a first exemplary embodiment is described.

Figure 1:
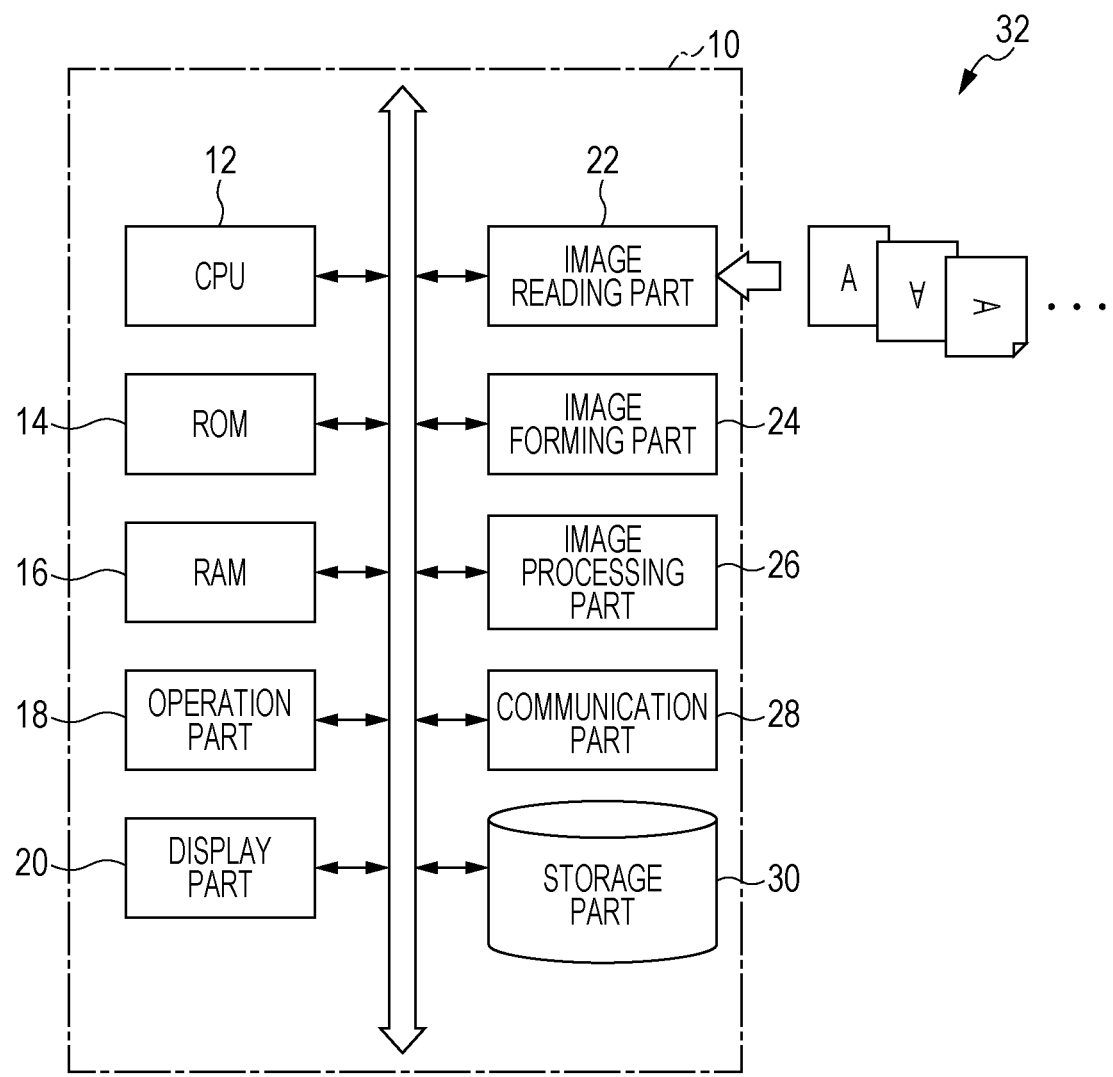
FIG. 1 is a configurational block diagram of an exemplary embodiment.

FIG. 1 is a configurational block diagram of the image processing apparatus 10. The image processing apparatus 10 is a so-called multifunction peripheral having, for example, a scanning function, a printing function, a copying function, and a facsimile function. The image processing apparatus 10 includes a central processing unit (CPU) 12, a read only memory (ROM) 14, a random access memory (RAM) 16, an operation part 18, a display part 20, an image reading part 22, an image forming part 24, an image processing part 26, a communication part 28, and a storage part 30. Those configurational blocks are connected to a bus and exchange data via the bus.

The CPU 12 executes various programs such as an operating system (OS) and an application. The ROM 14 stores a control program to be executed by the CPU 12. The RAM 16 is used as, for example, a working memory for the CPU 12. The CPU 12 reads the control program stored in the ROM 14 and executes the control program by using the RAM 16 as a working area. When the control program is executed by the CPU 12, various functions of the image processing apparatus 10 are implemented.

The operation part 18 receives a user's operation for the image processing apparatus 10. For example, the operation part 18 is constructed of hardware keys or a touch panel that outputs a control signal based on a touch position. Any touch detecting means may be used, such as means for detecting a pressure generated by touch or detecting static electricity of a touched object.

For example, the display part 20 is constructed of a liquid crystal display or an organic EL display and displays data on the image processing apparatus 10. The display part 20 displays a screen to be referenced by the user when the user operates the image processing apparatus 10. The display part 20 may be integrated with the operation part 18.

The image reading part 22 reads images formed on documents 32 that are set, for example, on an auto document feeder (ADF) by the user and generates image data indicating the read images. For example, the image reading part 22 is a scanner that may use a charge coupled device (CCD) system in which light is radiated from a light source onto a document and the light reflected from the document is condensed by a lens and received by CCDs or a contact image sensor (CIS) system in which light is sequentially radiated from an LED light source onto a document and the light reflected from the document is received by a CIS. All the documents 32 are not always aligned in a fixed direction but may be set in any directions (randomly) as illustrated in FIG. 1.

The image forming part 24 includes a printing mechanism that forms an image on a recording medium such as paper. For example, the image forming part 24 is a printer that may use an electrophotographic system in which an image is formed by transferring, onto a recording medium, toner adhering to a photoconductor, an ink jet system in which an image is formed by ejecting ink onto a recording medium, or a laser system.

The image processing part 26 performs image processing such as color correction or tone correction for an image indicated by image data.

The communication part 28 is connected to a communication network (not illustrated) and communicates with a different apparatus connected to the communication network. For example, image data is transmitted to or received from the different apparatus via the communication part 28. The different apparatus is a user terminal, a cloud server, or the like.

The storage part 30 has a storage area of a hard disk drive or the like and stores, for example, data received via the communication part 28 and data generated by the image processing apparatus 10. The storage part 30 may store the control program to be executed by the CPU 12.

Based on the control program, the CPU 12 of the image processing apparatus 10 makes determination on erecting directions of the individual documents 32 for image data generated by reading images formed on the documents 32 and outputs results of the determination. For example, the results of the determination on the erecting directions may be used for recognizing characters included in the image data. The erecting direction is a direction in which characters in an image may be read properly. For example, optical character recognition (OCR) is used for the determination on the erecting direction or the character recognition. The OCR is a technology in which characters in image data are analyzed and converted into character data to be used by a computer.

Next, the functional configuration of the image processing apparatus 10 is described.

Figure 2:
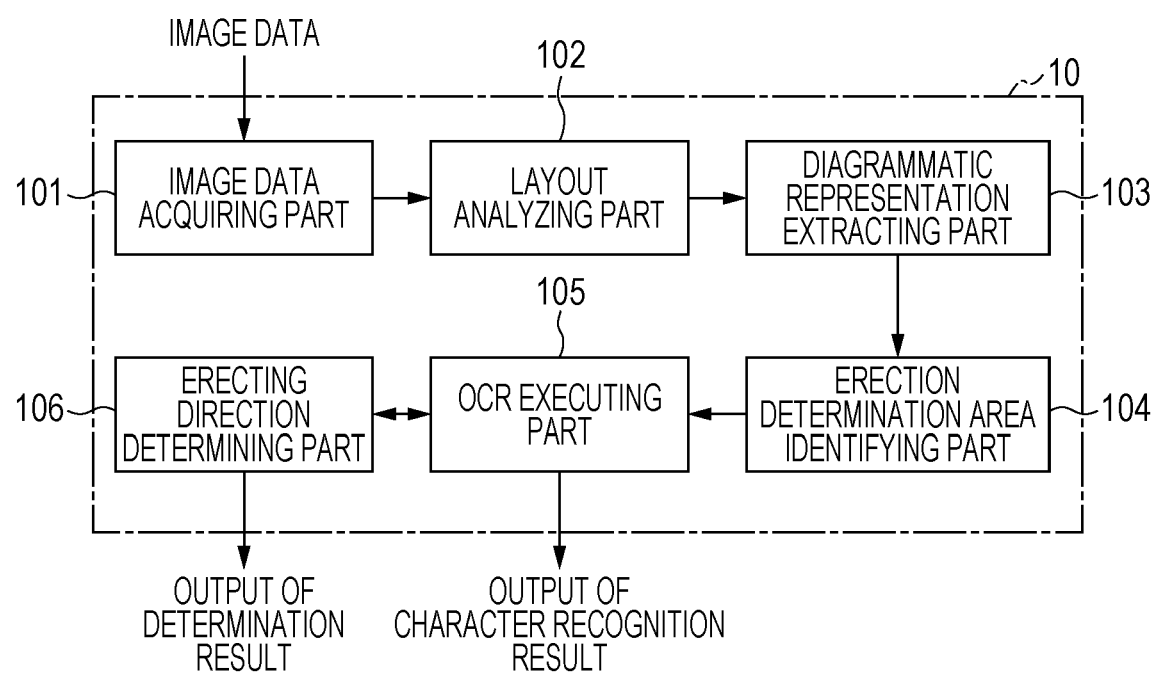
FIG. 2 is a functional block diagram of the exemplary embodiment.

FIG. 2 is a functional block diagram of the image processing apparatus 10. As the functional blocks, the image processing apparatus 10 includes an image data acquiring part 101, a layout analyzing part 102, a diagrammatic representation extracting part 103, an erection determination area identifying part 104, an OCR executing part 105, and an erecting direction determining part 106.

The image data acquiring part 101 acquires image data generated in such a manner that the image reading part 22 reads an image formed on the document 32.

The layout analyzing part 102 analyzes the layout of the image included in the image data acquired by the image data acquiring part 101. For example, the layout analyzing part 102 analyzes the layout of the image in the image data by extracting a block of information (characters and diagrammatic representations) based on a contrast to the background or by extracting a diagrammatic representation area based on a continuity of a color tone. In the exemplary embodiment, the layout analyzing part 102 particularly analyzes a block of diagrammatic representations (including outline borders and gridlines) in the image data and the position of the block. In this layout analysis, the pixel distribution of the diagrammatic representation is detected and a relative degree of the pixel distribution is analyzed. In particular, analysis is made for an area having a relatively higher degree of pixel distribution, that is, a relatively higher frequency of presence of pixels than the other area.

The diagrammatic representation extracting part 103 determines whether a diagrammatic representation is included in the image data by using an analysis result from the layout analyzing part 102. When the diagrammatic representation is included, the diagrammatic representation is extracted. The diagrammatic representation means at least one of a diagram and a table.

The erection determination area identifying part 104 identifies an erection determination area in the image data, in which erection determination is to be made, by using the diagrammatic representation extracted by the diagrammatic representation extracting part 103. The erection determination area identifying part 104 identifies, as the erection determination area, an area having a specific positional relationship with the extracted diagrammatic representation, specifically, an area having a high probability of presence of a character string that may be used for the erection determination. One or a plurality of erection determination areas may be identified. When a plurality of erection determination areas are identified, priority levels may be set for the plurality of erection determination areas. The priority level may be set higher in an area having a higher probability of presence of a character string. For example, priority is given to a wide area or an area having a high frequency of presence of pixels. Description is given later of a specific area having a high probability of presence of a character string in the positional relationship with the diagrammatic representation.

The OCR executing part 105 functions as a character recognizing part and executes OCR processing for the erection determination area identified by the erection determination area identifying part 104 to recognize characters included in the erection determination area. Specifically, the OCR executing part 105 reads each character included in the erection determination area in, for example, four directions of 0°, 90°, 180°, and 270° and compares the character with character patterns in a predetermined dictionary. In each of the four directions, the OCR executing part 105 identifies a character pattern in the dictionary that has a closest feature and calculates its certainty factor. The certainty factor is a ratio indicating how feature points of a character of a recognition target and a character of a recognition result match with each other. Any method may be used for calculating the certainty factor. For example, when a distance between a feature vector extracted from input image data and a feature vector in an OCR dictionary is calculated and a character in the dictionary that is closest to the input character is selected and output as a recognition result, an index value r is calculated based on the following expression by using inverses of distance values of a first candidate character and a second candidate character of the recognition result.

$$r=v1/(v1+v2)$$

In this expression, v1 and v2 are inverses of the distance values of the first candidate character and the second candidate character, respectively. Through evaluation against characters for learning that are collected in advance, histograms of the value r with respect to characters that are recognized correctly and characters that are not recognized correctly are determined and the certainty factor is calculated by using the histograms.

The erecting direction determining part 106 functions as an erecting direction deciding part and makes determination on an erecting direction of each character by using the certainty factor calculated by the OCR executing part 105. The erecting direction determining part 106 determines that a direction having a highest frequency of determination is the erecting direction of the image data and outputs the determined direction. For example, when the erection determination area includes five characters and it is determined that the direction of 0° is the erecting direction for the first to fourth characters and the direction of 180° is the erecting direction for the fifth character, the erecting direction determining part 106 determines that the direction of 0° is the erecting direction of the image data.

The functional blocks of FIG. 2 are implemented in such a manner that the CPU 12 executes a processing program. A part of the functional blocks may be implemented through hardware processing instead of software processing that involves execution of a program. The hardware processing may be performed by using a circuit such as an application-specific integrated circuit (ASIC) or a field-programmable gate array (FPGA).

Next, the processing of the exemplary embodiment is described taking a table as an example of the diagrammatic representation.

Figure 3:
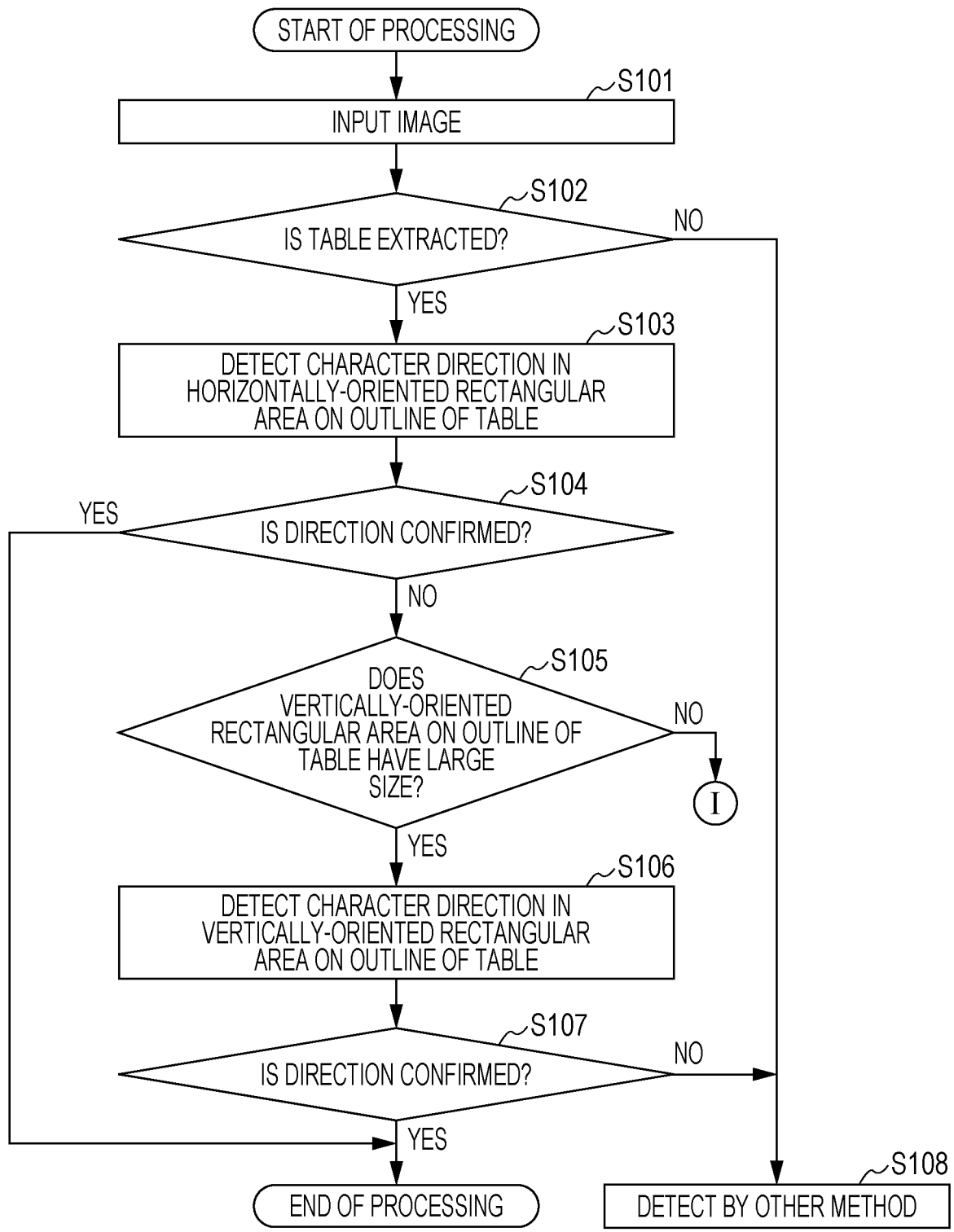
FIG. 3 is a processing flowchart (part 1) of the exemplary embodiment.
Figure 4:
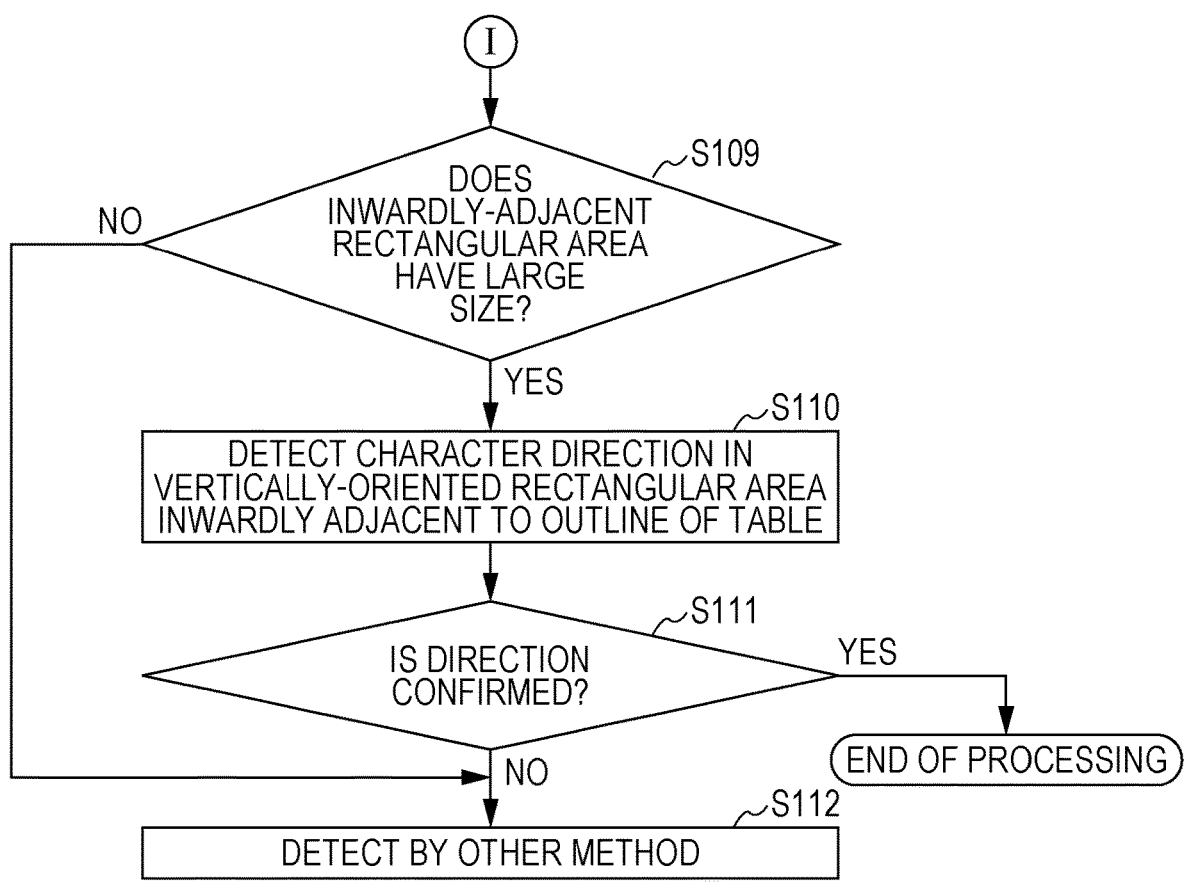
FIG. 4 is a processing flowchart (part 2) of the exemplary embodiment.

FIG. 3 and FIG. 4 are processing flowcharts of the exemplary embodiment. The processing is executed by the CPU 12 based on the processing program.

First, when the image data acquiring part 101 acquires image data, the image data is input to the layout analyzing part 102 (S101). The layout analyzing part 102 executes layout analysis for the image data and outputs an analysis result to the diagrammatic representation extracting part 103. In the layout analysis, a block of diagrammatic representations is extracted. When the diagrammatic representation is a table, outline borders and gridlines are extracted as continuous lines that constitute the table. By extracting outline borders and gridlines, information on the size, the position, and the numbers of rows and columns of the table is obtained. Further, information on the widths of rows and columns is obtained and information on a relationship among the relative degrees of the widths is obtained as well.

The diagrammatic representation extracting part 103 determines whether a table is included in the image data by using layout analysis data (S102). When a table is extracted (YES in S102), a character direction in a horizontally-oriented rectangular area on the outline of the table is detected (S103). That is, the erection determination area identifying part 104 identifies a horizontally-oriented rectangular area on the outline of the extracted table as the erection determination area and outputs the erection determination area to the OCR executing part 105. When the table is regarded as a matrix, the horizontally-oriented rectangular area on the outline of the table means an uppermost row or a lowermost row. A row direction means a direction perpendicular to, for example, a long-side direction of A4 copy paper. In other words, the row direction means a direction parallel to a short-side direction of A4 copy paper. Specifically, when the table is constituted by five rows and four columns, the horizontally-oriented rectangular area on the outline of the table means the uppermost first row or the lowermost fifth row. The OCR executing part 105 executes OCR for the identified area in four directions of 0°, 90°, 180°, and 270°, calculates certainty factors, and outputs the certainty factors to the erecting direction determining part 106. The erecting direction determining part 106 detects the character direction in the erection determination area by using the calculated certainty factors.

After the character direction in the erection determination area has been detected, the erecting direction determining part 106 determines whether the direction of the image data is confirmed (S104). For example, the erecting direction determining part 106 executes the processing of S103 for all the characters in the erection determination area. When a direction having a highest frequency of determination is present, the erecting direction determining part 106 determines that the direction is confirmed (YES in S104), outputs the confirmed direction as the erecting direction, and terminates the processing. When the direction is not confirmed, for example, when the frequencies of 0° and 90° are substantially equal to each other, the erecting direction determining part 106 determines that the direction is not confirmed (NO in S104) and proceeds to the next processing.

In the next processing, the erection determination area identifying part 104 determines whether the size of a vertically-oriented rectangular area on the outline of the extracted table is equal to or larger than a threshold (S105). When the table is regarded as a matrix, the vertically-oriented rectangular area on the outline of the table means a leftmost column or a rightmost column. A column direction means a direction parallel to, for example, a long-side direction of A4 copy paper. Specifically, when the table is constituted by five rows and four columns, the vertically-oriented rectangular area on the outline of the table means the leftmost first column or the rightmost fourth column. For example, the threshold is set in relation to the width of the column and may be set as a width at which a minimum number of characters necessary for the erection determination may be present. The threshold may be set by using the number of pixels corresponding to the minimum number of characters necessary for the erection determination. When the size is equal to or larger than the threshold (YES in S105), a character direction in the vertically-oriented area on the outline is detected (S106). That is, the erection determination area identifying part 104 identifies a vertically-oriented rectangular area on the outline of the extracted table as the erection determination area and outputs the erection determination area to the OCR executing part 105. The OCR executing part 105 executes OCR for the identified area in four directions of 0°, 90°, 180°, and 270°, calculates certainty factors, and outputs the certainty factors to the erecting direction determining part 106. The erecting direction determining part 106 detects the character direction in the erection determination area by using the calculated certainty factors.

After the character direction in the erection determination area has been detected, the erecting direction determining part 106 determines whether the direction of the image data is confirmed (S107). For example, the erecting direction determining part 106 executes the processing of S106 for all the characters in the erection determination area. When a direction having a highest frequency of determination is present, the erecting direction determining part 106 determines that the direction is confirmed (YES in S107), outputs the confirmed direction as the erecting direction, and terminates the processing. When the direction is not confirmed, for example, when the frequencies of 0° and 90° are substantially equal to each other, the erecting direction determining part 106 determines that the direction is not confirmed (NO in S107) and detects the direction by another method (S108). When a table is not included in the image data in S102, the erecting direction determining part 106 similarly detects the direction by another method (S108).

When the result of S105 is NO, that is, when the direction is not confirmed in the horizontally-oriented rectangular area on the outline of the table and in the vertically-oriented rectangular area on the outline of the table, the processing proceeds to processing of FIG. 4.

In FIG. 4, the erection determination area identifying part 104 determines whether the size of a rectangular area inwardly adjacent to the vertically-oriented rectangular area of the extracted table is equal to or larger than the threshold (S109). When the table is regarded as a matrix, the inwardly-adjacent vertically-oriented rectangular area means a column inwardly adjacent to the left end or a column inwardly adjacent to the right end. Specifically, when the table is constituted by five rows and four columns, the inwardly-adjacent vertically-oriented rectangular area means the second column or the third column. When the size is equal to or larger than the threshold (YES in S109), a character direction in the inwardly-adjacent vertically-oriented area is detected (S110). That is, the erection determination area identifying part 104 identifies an inwardly-adjacent vertically-oriented rectangular area as the erection determination area and outputs the erection determination area to the OCR executing part 105. The OCR executing part 105 executes OCR for the identified area in four directions of 0°, 90°, 180°, and 270°, calculates certainty factors, and outputs the certainty factors to the erecting direction determining part 106. The erecting direction determining part 106 detects the character direction in the erection determination area by using the calculated certainty factors.

After the character direction in the erection determination area has been detected, the erecting direction determining part 106 determines whether the direction of the image data is confirmed (S111). For example, the erecting direction determining part 106 executes the processing of S110 for all the characters in the erection determination area. When a direction having a highest frequency of determination is present, the erecting direction determining part 106 determines that the direction is confirmed (YES in S111), outputs the confirmed direction as the erecting direction, and terminates the processing. When the direction is not confirmed, for example, when the frequencies of 0° and 90° are substantially equal to each other, the erecting direction determining part 106 determines that the direction is not confirmed (NO in S111) and detects the direction by another method (S112).

As described above, in this exemplary embodiment, the erection determination area identifying part 104 identifies the horizontally-oriented rectangular area on the outline of the table, the vertically-oriented rectangular area on the outline of the table, and the vertically-oriented rectangular area inwardly adjacent to the vertically-oriented rectangular area on the outline of the table as the erection determination areas and makes determination on the erecting direction of the image data. The horizontally-oriented rectangular area on the outline of the table, the vertically-oriented rectangular area on the outline of the table, and the vertically-oriented rectangular area inwardly adjacent to the vertically-oriented rectangular area on the outline of the table are identified as the areas having a high probability of presence of a character string that may be used for the erection determination. Those areas are decided by using relative positions in the extracted diagrammatic representation. Next, those areas are described in more detail.

FIG. 5 illustrates an example of the horizontally-oriented rectangular area on the outline of the table that is identified as the erection determination area in S103. A table 200 is constituted by an outline and a plurality of gridlines. Horizontally-oriented rectangular areas 202 and 204 on the outline are present at the upper end and the lower end of the table, respectively. The horizontally-oriented rectangular area 202 corresponds to a rectangular area in a first row and the horizontally-oriented rectangular area 204 corresponds to a rectangular area in a fifth row. The names of entries in the respective rows are generally placed in the horizontally-oriented rectangular area 202 at the upper end. For example, "ITEM", "QUANTITY", "UNIT", "UNIT PRICE", and "AMOUNT" are placed. For example, the total of the respective rows is placed in the horizontally-oriented rectangular area 204 at the lower end. For example, "SUBTOTAL" is placed. Focusing on the fact that a character string is often included statistically or customarily in the horizontally-oriented rectangular area 202 at the upper end and the horizontally-oriented rectangular area 204 at the lower end, the erection determination area identifying part 104 identifies the horizontally-oriented rectangular areas 202 and 204 as the erection determination areas by using this fact. Compared with those areas, a number string is relatively often included at an inner part of the table and therefore the accuracy of the erection determination may decrease. Since a character string is often included statistically or customarily in the horizontally-oriented rectangular area 202 at the upper end and the horizontally-oriented rectangular area 204 at the lower end, the decrease in the determination accuracy is suppressed by using the character string in those areas.

The erection determination area identifying part 104 may identify at least one of the horizontally-oriented rectangular area 202 at the upper end and the horizontally-oriented rectangular area 204 at the lower end as the erection determination area. The erection determination area identifying part 104 may first identify the horizontally-oriented rectangular area 202 at the upper end as the erection determination area and then identify the horizontally-oriented rectangular area 204 at the lower end as the erection determination area when the erecting direction is not confirmed. Specifically, for example, a direction along the long side of A4 copy paper is defined as a vertical direction. OCR is executed while identifying the horizontally-oriented rectangular area 202 at the upper end under the assumption that one side in the vertical direction is an upper side. When the erecting direction is not confirmed, OCR is executed while identifying the horizontally-oriented rectangular area 204 at the lower end under the assumption that a side opposite the upper side in the vertical direction is a lower side.

FIG. 6 illustrates an example of the vertically-oriented rectangular area on the outline of the table that is identified as the erection determination area in S105. A vertically-oriented rectangular area 206 is present at the left end of the table 200. The vertically-oriented rectangular area 206 corresponds to a rectangular area in a first column. The names of entries in the respective columns are generally placed in the vertically-oriented rectangular area 206 at the left end. For example, "ITEM", "MULTI-LOGGER", "BASE SET", "EXTENSION TERMINAL", and "SUBTOTAL" are placed.

Focusing on the fact that a character string is often included statistically or customarily in the vertically-oriented rectangular area 206 at the left end, the erection determination area identifying part 104 identifies the vertically-oriented rectangular area 206 as the erection determination area by using this fact.

FIG. 6 illustrates the vertically-oriented rectangular area 206 at the left end but the erection determination area identifying part 104 may identify a vertically-oriented rectangular area at the right end as the erection determination area. The erection determination area identifying part 104 may identify at least one of the vertically-oriented rectangular area at the left end and the vertically-oriented rectangular area at the right end as the erection determination area. The vertically-oriented rectangular area at the right end corresponds to a rectangular area in a fifth column.

In S105, the vertically-oriented rectangular area is identified as the erection determination area only when the size of the vertically-oriented rectangular area is equal to or larger than the threshold. This operation is performed in consideration of the fact that a character string is not included with a relatively high probability when the size of the vertically-oriented rectangular area, that is, the size of the vertically-oriented rectangular area in a lateral direction is small because only numerals or symbols are placed.

FIG. 7 illustrates an example of the vertically-oriented rectangular area that is inwardly adjacent to the vertically-oriented rectangular area on the outline of the table and is identified as the erection determination area in S110. A vertically-oriented rectangular area 208 is present so as to be inwardly adjacent to the vertically-oriented rectangular area at the left end of the table 200, that is, so as to neighbor the vertically-oriented rectangular area at the left end in the lateral direction. The vertically-oriented rectangular area 208 corresponds to a rectangular area in a second column. Only "No." and numerals are placed in the vertically-oriented rectangular area at the left end but the names of entries in the respective columns are placed in the inwardly-adjacent vertically-oriented rectangular area 208. For example, "ITEM", "SOFTWARE DEVELOPMENT", "DESIGNING", "IMPLEMENTATION", "GENERAL AND ADMINISTRATIVE EXPENSES", and "SUBTOTAL" are placed.

Focusing on the fact that a character string is often included statistically or customarily in the inwardly-adjacent vertically-oriented rectangular area 208 compared with the vertically-oriented rectangular area at the left end, the erection determination area identifying part 104 identifies the vertically-oriented rectangular area 208 as the erection determination area by using this fact.

When the extracted table is regarded as a matrix having m rows and n columns with respect to the long side or the short side of the table, the horizontally-oriented rectangular area on the outline of the table and the vertically-oriented rectangular area on the outline of the table correspond to the following row or column.

Horizontally-oriented rectangular area on outline of table: first row or m-th row Vertically-oriented rectangular area on outline of table: first column or n-th column Those areas may be represented as areas including the outline of the table. When the lengths of the outline borders of the extracted table are different from each other, those areas may be represented as areas to which the longest side belongs. For example, the horizontally-oriented rectangular areas 202 and 204 of FIG. 5 are the areas to which the longest side of the table belongs. The vertically-oriented rectangular area 206 of FIG. 6 is an area to which the second longest side belongs.

When the table is regarded as a matrix having m rows and n columns, the vertically-oriented rectangular area inwardly adjacent to the vertically-oriented rectangular area on the outline of the table corresponds to the following column.

Vertically-oriented rectangular area inwardly adjacent to vertically-oriented rectangular area on outline of table: second column or (n−1)th column This area may be represented as an area adjacent to the area including the outline of the table.

The horizontally-oriented rectangular area on the outline of the table is an area where the names of entries in the respective rows are placed and therefore tends to be relatively wider than the other rows. Focusing on this fact, the widest area among the areas including the outline of the table may be identified as the erection determination area.

SECOND EXEMPLARY EMBODIMENT

In the first exemplary embodiment, the horizontally-oriented rectangular area on the outline of the table, the vertically-oriented rectangular area on the outline of the table, and the vertically-oriented rectangular area inwardly adjacent to the vertically-oriented rectangular area on the outline of the table are identified as the erection determination areas and determination is made on the erecting direction of the image data. In addition, there may be an area where a character string that may be used for the erection determination is included with a high probability in the positional relationship with the diagrammatic representation. Examples of this area include an area where the title of the diagrammatic representation is placed.

Figure 8:
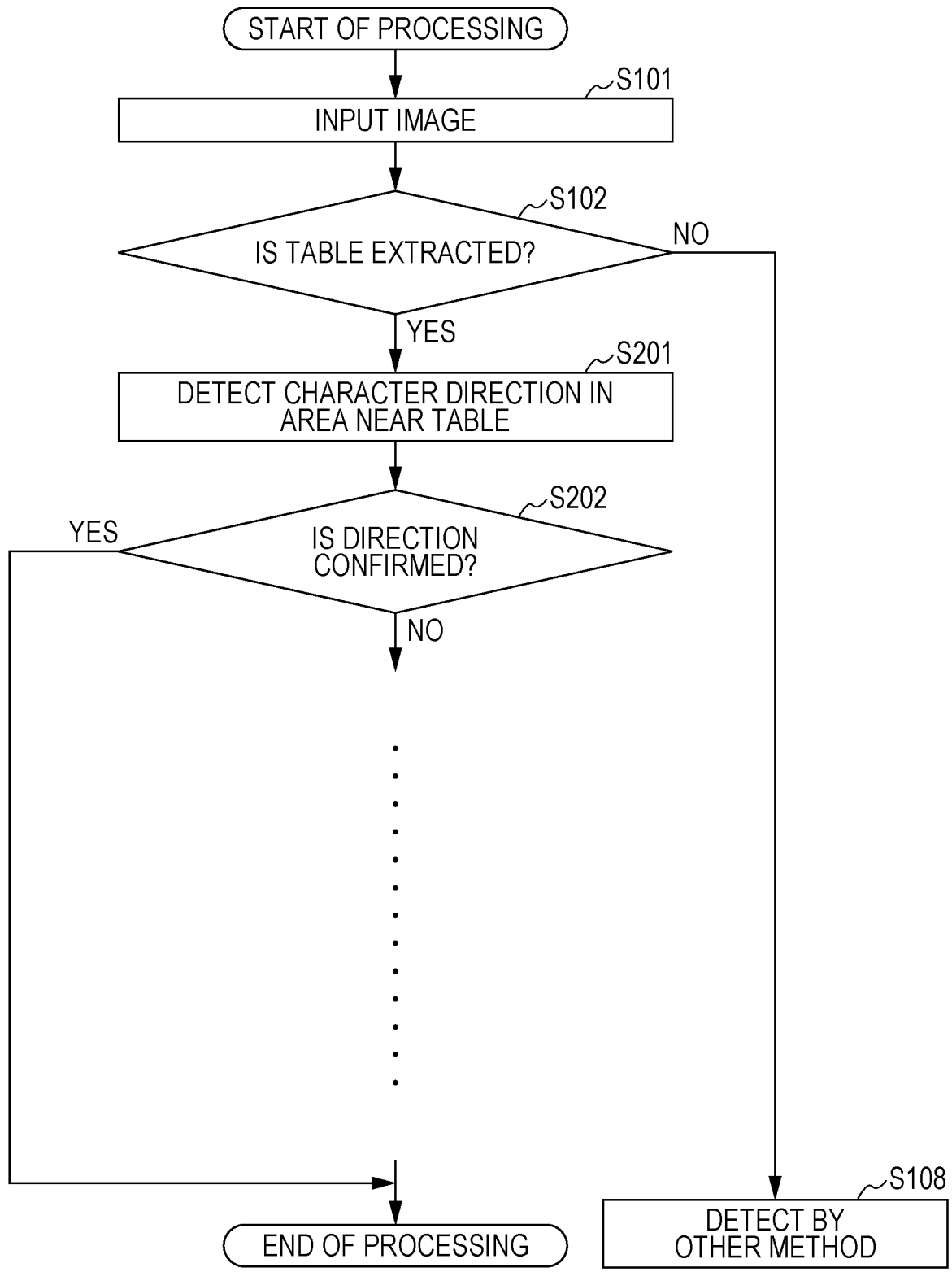
FIG. 8 is a processing flowchart of another exemplary embodiment.

FIG. 8 is a processing flowchart of a second exemplary embodiment. FIG. 8 is different from FIG. 3 in terms of processing of detecting a character direction in an area near the table when the table is extracted in S102 (S201). That is, when a block of image data is present within a predetermined distance from the outline of the extracted table, more specifically, within a predetermined distance from the upper end of the outline or the lower end of the outline, the erection determination area identifying part 104 identifies an area of the block as the erection determination area while the area is regarded as an area of the title of the diagrammatic representation. For example, the upper end of the outline means one side in the long-side direction of A4 copy paper and the lower end of the outline means the other side in the long-side direction of A4 copy paper.

The erection determination area identifying part 104 outputs the identified erection determination area to the OCR executing part 105. The OCR executing part 105 executes OCR for the identified area in four directions of 0°, 90°, 180°, and 270°, calculates certainty factors, and outputs the certainty factors to the erecting direction determining part 106. The erecting direction determining part 106 detects the character direction in the erection determination area by using the calculated certainty factors.

After the character direction in the erection determination area has been detected, the erecting direction determining part 106 determines whether the direction of the image data is confirmed (S202). For example, the erecting direction determining part 106 executes the processing of S201 for all the characters in the erection determination area. When a direction having a highest frequency of determination is present, the erecting direction determining part 106 determines that the direction is confirmed (YES in S202), outputs the confirmed direction as the erecting direction, and terminates the processing. When the direction is not confirmed, for example, when the frequencies of 0° and 90° are substantially equal to each other, the erecting direction determining part 106 determines that the direction is not confirmed (NO in S202) and executes the processing of S103 and other subsequent processing in FIG. 3.

As described above, the area near the diagrammatic representation, in which the title of the diagrammatic representation is placed, is identified as the erection determination area in addition to the horizontally-oriented rectangular area on the outline of the table, the vertically-oriented rectangular area on the outline of the table, and the vertically-oriented rectangular area inwardly adjacent to the vertically-oriented rectangular area on the outline of the table. Thus, the decrease in the erection determination accuracy is suppressed.

Figures 9, 10:
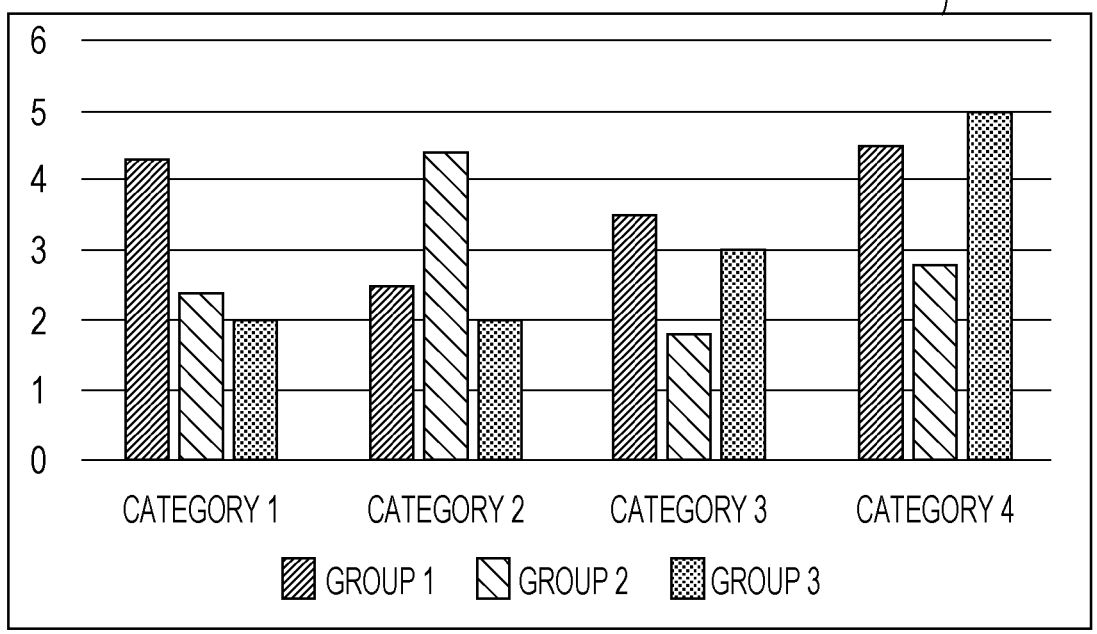
FIG. 9 illustrates an example of an erection determination area of the other exemplary embodiment.
FIG. 10 illustrates another example of the erection determination area of the other exemplary embodiment.

FIG. 9 illustrates an example of an area where the title of a table is placed. A title area 210 of "TABLE 1. LIST OF SOFTWARE EXPENSES" is present above the table 200, specifically, within a predetermined distance from the upper end of the outline of the table. The title area 210 is identified as the erection determination area.

FIG. 10 illustrates an example of an area where the title of a diagram is placed. A title area 302 of "FIG. 1. FREQUENCY DISTRIBUTION" is present above a diagram 300, specifically, within a predetermined distance from the upper end of the diagram. The title area 302 is identified as the erection determination area.

In the first and second exemplary embodiments, the upper, lower, right, and left parts of the table may uniquely be decided based on the long side of copy paper. For example, a direction along the long side of A4 copy paper is defined as a vertical direction and one side in the vertical direction is defined as an upper part while the other side is defined as a lower part. After the upper part and the lower part have been decided, a direction along the short side of A4 copy paper is defined as a lateral direction. The upper, lower, right, and left parts may be decided based on the short side of copy paper but this decision is substantially equivalent to the decision based on the long side of copy paper. If no title is present in FIG. 9 within a predetermined distance from the upper end of the outline of the table 200 that is defined as described above, the erecting direction of the table may be a direction rotated by 90° or 270°. In this case, it is appropriate that OCR be executed for an area within a predetermined distance from the left end or the right end of the outline of the table 200. The same applies to the case of FIG. 10. In short, it is appropriate that an area within a predetermined distance from the outline of the table 200 (in the vertical or lateral direction) be identified as the erection determination area. The predetermined distance is generally a fixed value but may be a variable through the user's setting.

Modified examples are described below.

MODIFIED EXAMPLE 1

In the first exemplary embodiment, the horizontally-oriented rectangular area on the outline of the table, the vertically-oriented rectangular area on the outline of the table, and the vertically-oriented rectangular area inwardly adjacent to the vertically-oriented rectangular area on the outline of the table are identified as the erection determination areas and the priority levels are provided for those areas. As the priority order, the following order is set.

1. Horizontally-oriented rectangular area on outline of table
2. Vertically-oriented rectangular area on outline of table
3. Vertically-oriented rectangular area inwardly adjacent to vertically-oriented rectangular area on outline of table Any other priority order may be set. For example, the following order may be set.

1. Vertically-oriented rectangular area on outline of table
2. Vertically-oriented rectangular area inwardly adjacent to vertically-oriented rectangular area on outline of table
3. Horizontally-oriented rectangular area on outline of table The same applies to the second exemplary embodiment. In the second exemplary embodiment, the horizontally-oriented rectangular area on the outline of the table, the vertically-oriented rectangular area on the outline of the table, the vertically-oriented rectangular area inwardly adjacent to the vertically-oriented rectangular area on the outline of the table, and the area of the title of the diagrammatic representation are identified as the erection determination areas and the priority levels are provided for those areas. As the priority order, the following order is set.

1. Area of title of diagrammatic representation
2. Horizontally-oriented rectangular area on outline of table
3. Vertically-oriented rectangular area on outline of table
4. Vertically-oriented rectangular area inwardly adjacent to vertically-oriented rectangular area on outline of table Any other priority order may be set. For example, the following order may be set.

1. Vertically-oriented rectangular area on outline of table
2. Vertically-oriented rectangular area inwardly adjacent to vertically-oriented rectangular area on outline of table
3. Horizontally-oriented rectangular area on outline of table
4. Area of title of diagrammatic representation This setting corresponds to such a setting that the processing "DETECT BY OTHER METHOD" in S108 and S112 of FIG. 3 and FIG. 4 is processing of identifying the area of the title of the diagrammatic representation as the erection determination area.

The priority level of the erection determination area may be variable instead of being fixed. The priority level may be variable through the user's setting. Specifically, the user sets the priority level for each type of diagrammatic representation included in the image data. The title area is set to the first place in the priority order for a certain type of diagrammatic representation while the horizontally-oriented rectangular area on the outline of the table is set to the first place in the priority order for a different type of diagrammatic representation.

MODIFIED EXAMPLE 2

In the first and second exemplary embodiments, the vertically-oriented rectangular area inwardly adjacent to the vertically-oriented rectangular area at the left end is identified as the erection determination area when the size of the vertically-oriented rectangular area at the left end, that is, the lateral length of the vertically-oriented rectangular area at the left end is equal to or smaller than the threshold or when the direction is not confirmed even though the size is equal to or larger than the threshold. In place of the inwardly-adjacent vertically-oriented rectangular area, a vertically-oriented rectangular area having a largest size in the row direction (width) in the table may be extracted and identified as the erection determination area. Specifically, when a vertically-oriented rectangular area corresponding to a third column from the left end is widest in a table having five columns, the vertically-oriented rectangular area in the third column is identified as the erection determination area.

MODIFIED EXAMPLE 3

In the first and second exemplary embodiments, for example, when the horizontally-oriented rectangular area on the outline of the table is identified as the erection determination area, the erecting directions and their certainty factors are calculated for the entire character string in the horizontally-oriented rectangular area and a direction having a highest frequency of determination is finally confirmed as the erecting direction of the image data. The erecting direction of the image data may be confirmed when OCR is sequentially executed for a character string present in an area identified as the erection determination area and a sufficiently large certainty factor is obtained for a certain character, for example, when a certainty factor equal to or larger than a reference value (for example, 98%) is obtained for a certain character. That is, there is no need to execute OCR and calculate certainty factors for the entire character string in the erection determination area. The reference value may be fixed as a default value but may be a variable that may be set by the user.

MODIFIED EXAMPLE 4

In the exemplary embodiments, when the table is regarded as a matrix, a widest row or column is identified as the erection determination area. A pixel density obtained as a result of the layout analysis may be used and a row or column having a highest pixel density (highest frequency of presence) may be identified as the erection determination area. Alternatively, a widest row or column having a highest pixel density may be identified as the erection determination area.

MODIFIED EXAMPLE 5

In the exemplary embodiments, when the table is regarded as a matrix, a row or column that satisfies a predetermined condition is identified as the erection determination area. The row or column may be plural. Specifically, in a matrix having m rows and n columns, a plurality of rows less than m rows or a plurality of columns less than n columns may be identified as the erection determination areas. Further, a row and a column that satisfy a predetermined condition may be identified as the erection determination areas. For example, the first row and the first column, the first row and the second column, or the first row, the m-th row, and the first column may be identified.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus, comprising:
    a processor, configured to:
        execute layout analysis for image data;
        extract a diagrammatic representation from the image data by using a result of the layout analysis;
        execute character recognition for a partial area having a high probability of presence of a character string in a positional relationship with the extracted diagrammatic representation; and
        decides decide an erecting direction of the image data by using a result of the character recognition for the partial area.

2. The image processing apparatus according to claim 1, wherein the partial area is decided based on a relative position in the extracted diagrammatic representation.

3. The image processing apparatus according to claim 1, wherein, when the extracted diagrammatic representation has m rows and n columns (m and n are natural numbers) with respect to a long side or a short side of the image data, the partial area is an area in a first row or an m-th row.

4. The image processing apparatus according to claim 3, wherein, when the extracted diagrammatic representation has the m rows and the n columns (m and n are natural numbers) with respect to the long side or the short side of the image data and when the erecting direction is not confirmed as a result of the character recognition for the first row that is executed, the m-th row is then set as the partial area.

5. The image processing apparatus according to claim 1, wherein, when the extracted diagrammatic representation has m rows and n columns (m and n are natural numbers) with respect to a long side or a short side of the image data, the partial area is an area in a first column or an n-th column.

6. The image processing apparatus according to claim 5, wherein, when the extracted diagrammatic representation has the m rows and the n columns (m and n are natural numbers) with respect to the long side or the short side of the image data and when the erecting direction is not confirmed as a result of the character recognition for the first column that is executed, the n-th column is then set as the partial area.

7. The image processing apparatus according to claim 1, wherein, when the extracted diagrammatic representation has m rows and n columns (m and n are natural numbers) with respect to a long side or a short side of the image data and when a width of a second column or a width of an (n−1)th column is larger as a result of comparison between a width of a first column and the width of the second column and between a width of an n-th column and the width of the (n−1)th column, the second column or the (n−1)th column is set as the partial area.

8. The image processing apparatus according to claim 1, wherein, when the extracted diagrammatic representation has m rows and n columns (m and n are natural numbers) with respect to a long side or a short side of the image data, the partial area is an a-th column (1≤a≤n) that is a column having a relatively high frequency of presence of pixels as a result of the layout analysis.

9. The image processing apparatus according to claim 1, wherein, when the extracted diagrammatic representation has m rows and n columns (m and n are natural numbers) with respect to a long side or a short side of the image data, the partial area is an a-th column (1≤a≤n) that is a widest column as a result of the layout analysis.

10. The image processing apparatus according to claim 1, wherein, when the extracted diagrammatic representation extracted by the extraction part has m rows and n columns (m and n are natural numbers) with respect to a long side or a short side of the image data, the partial area is an a-th column (1≤a≤n) that is a widest column having a relatively high frequency of presence of pixels as a result of the layout analysis.

11. The image processing apparatus according to claim 1, wherein, when the extracted diagrammatic representation has m rows and n columns (m and n are natural numbers) with respect to a long side or a short side of the image data, the partial area is an area including a plurality of rows less than the in rows.

12. The image processing apparatus according to claim 1, wherein, when the extracted diagrammatic representation has m rows and n columns (m and n are natural numbers) with respect to a long side or a short side of the image data, the partial area is an area including a plurality of columns less than the n columns.

13. The image processing apparatus according to claim 1, wherein the processor sequentially executes the character recognition for the character string in the partial area and calculates a certainty factor of the character recognition, and wherein, when the certainty factor is equal to or larger than a reference value, the processor decides the erecting direction of the image data without executing the character recognition for a remaining part of the character string in the partial area by the character recognizing part.

14. The image processing apparatus according to claim 1, wherein the partial area is an area of a title of the extracted diagrammatic representation or, when the extracted diagrammatic representation has in rows and n columns (m and n are natural numbers), an area in a first row or an m-th row or an area in a first column or an n-th column, and wherein the processor first executes the character recognition for the area of the title of the diagrammatic representation and, when the erecting direction of the image data is not decided, then executes the character recognition for the area in the first row or the m-th row or executes the character recognition for the area in the first column or the n-th column.

15. The image processing apparatus according to claim 14, wherein, when the extracted diagrammatic representation has the m rows and the n columns (m and n are natural numbers), the partial area is an area in a second column or an (n−1)th column, and wherein the processor executes the character recognition for the area in the first column or the n-th column and, when the erecting direction of the image data is not decided, executes the character recognition for the area in the second column or the (n−1)th column.

16. The image processing apparatus according to claim 1, wherein the diagrammatic representation comprises a table having the character string, and wherein the processor detects a character direction of the character string in at least one of a horizontally-oriented rectangular area and a vertically-oriented rectangular area of the table so as to determine the erecting direction of the image data.

17. The image processing apparatus according to claim 1, wherein the diagrammatic representation comprises a table having the character string, and wherein the processor detects a character direction of the character string in an area near the table so as to determine the erecting direction of the image data.

18. A non-transitory computer readable medium storing a program causing a computer to execute a process comprising:

acquiring image data by reading a document;

executing layout analysis for the image data;

extracting a diagrammatic representation from the image data by using a result of the layout analysis;

executing character recognition for a partial area having a high probability of presence of a character string in a positional relationship with the extracted diagrammatic representation; and deciding and outputting an erecting direction of the image data by using a result of the character recognition for the partial area.

* * * * *